United States Patent
Okubo

(10) Patent No.: US 6,839,318 B2
(45) Date of Patent: Jan. 4, 2005

(54) OPTICAL INFORMATION RECORDING MEDIUM HAVING ULTRAVIOLET-CURING RESIN AND ADHESIVE LAYERS AND METHOD OF MANUFACTURING SAME

(75) Inventor: Shuichi Okubo, Tokyo (JP)

(73) Assignee: NEC Corporation, Tokyo (JP)

(*) Notice: Subject to any disclaimer, the term of this patent is extended or adjusted under 35 U.S.C. 154(b) by 274 days.

(21) Appl. No.: 09/949,840

(22) Filed: Sep. 12, 2001

(65) Prior Publication Data

US 2002/0057646 A1 May 16, 2002

(30) Foreign Application Priority Data

Sep. 13, 2000 (JP) ........................................ 2000-278380

(51) Int. Cl.$^7$ .................................................. G11B 7/24
(52) U.S. Cl. ................................... 369/275.5; 428/64.4
(58) Field of Search ........................ 369/275.5, 275.1, 369/13.35, 13.4, 13.38, 283; 428/64.1, 64.4, 64.3; 430/270.13

(56) References Cited

U.S. PATENT DOCUMENTS

| | | | | |
|---|---|---|---|---|
| 4,565,772 A | * | 1/1986 | Takeoka et al. | 430/320 |
| 4,800,112 A | * | 1/1989 | Kano et al. | 428/163 |
| 4,990,388 A | * | 2/1991 | Hamada et al. | 369/288 |
| 5,796,708 A | * | 8/1998 | Ohkawa et al. | 369/283 |
| 6,023,451 A | * | 2/2000 | Kashiwagi et al. | 369/275.5 |
| 6,083,598 A | * | 7/2000 | Ohkubo et al. | 428/64.1 |
| 6,146,733 A | * | 11/2000 | Inoue et al. | 428/64.1 |
| 6,278,683 B1 | * | 8/2001 | Hayashi | 369/275.5 |
| 6,403,193 B1 | * | 6/2002 | Shingai et al. | 428/64.1 |
| 6,410,116 B1 | * | 6/2002 | Hirata | 428/64.1 |
| 6,411,591 B1 | * | 6/2002 | Moritani et al. | 369/275.2 |
| 6,649,240 B2 | * | 11/2003 | Ohishi | 428/64.1 |

FOREIGN PATENT DOCUMENTS

JP     A 11-273147     10/1999

* cited by examiner

*Primary Examiner*—Tan Dinh
(74) *Attorney, Agent, or Firm*—Sughrue Mion, PLLC

(57) ABSTRACT

Recording layer 12 is formed on substrate 11, ultraviolet-curing resin layer 13 is formed on recording layer 12, and light-transmissible layer 15 is attached to the ultraviolet-curing resin layer 13 through adhesive layer 14. It is preferable that the hardness of the ultraviolet-curing resin 13 is equal to HB or more, and the film thickness thereof is set to a value in the range from 2 μm to 40 μm. The total thickness of the ultraviolet-curing resin layer 13, the adhesive layer 14 and the light-transmissible layer 15 is set to a value in the range from 20 μm to 150 μm.

4 Claims, 2 Drawing Sheets

OPTICAL INFORMATION RECORDING MEDIUM HAVING ULTRAVIOLET-CURING RESIN AND ADHESIVE LAYERS AND METHOD OF MANUFACTURING SAME

BACKGROUND OF THE INVENTION

1. Field of the Invention

The present invention relates to an optical information recording medium for recording/reproducing information by irradiating laser beams, and a method of manufacturing the same and particularly, to an optical information recording medium which has an optical information recording layer on a substrate and a light-transmissible layer on the optical information recording layer and carries out recording and reproduction of information by irradiating laser beams from a light-transmissible layer side, and a method of manufacturing the same.

2. Description of the Related Art

A method of increasing the numerical aperture (NA) of an objective lens for focusing laser beams to perform recording/reproduction of information is known as means of enhancing the surface recording density of an optical disk (disc). The increase of the numerical aperture (NA) reduces the width of the laser beam to be focused onto the disk, and thus information having high density can be recorded/reproduced. NA used to reproduce a conventional compact disk (CD) is equal to 0.45, however, an optical head having NA=0.6 is used for reproduction of a digital versatile disk (DVD). Further, there has been recently proposed an optical head whose NA is increased to 0.8 or more. If NA is increased, there would occur such a disadvantage that the permissible amount of aberration occurring due to an angle (tilt angle) at which the surface of the substrate is misaligned from the vertical direction with respect to the optical axis of the focused laser beam is reduced Therefore, it is preferable that the thickness of the substrate is as small as possible when NA is equal to a high value. For example, the thickness of the substrate is set at 1.2 mm (millimeter) for CD, however, it is set at 0.6 mm for DVD. In such a case that NA is increased to 0.8 or more, there is used a method of forming an optical information recording layer on a substrate and then forming a light-transmissible layer of about 0.1 mm in thickness to record/reproduce information from the light-transmissible layer side.

As a method of forming a light-transmissible layer is known a method of adhesively attaching a transparent film onto a recording layer through an adhesive layer such as a pressure-sensitive adhesive sheet, as disclosed in Japanese Laid-open Patent Publication No. Hei-11-273147. However, when this method is applied to an optical information recording medium having a recording layer formed of a phase change recording layer or an optical information recording medium having a recording layer formed of a dye-based recording layer on which only one recording is possible, there occurs such a disadvantage that thermal deformation occurs due to irradiation of laser beams when initialization or information recording is carried out, so that noises are greatly increased.

SUMMARY OF THE INVENTION

Therefore, an object of the present invention is to provide an optical information recording medium having an optical information recording layer on a substrate and a light-transmissible layer formed on the optical information recording layer and performing the recording and/or reproducing of high-density information by irradiating laser beams from the light-transmissible layer side, in which excellent initialization and excellent recording can be performed without inducing thermal deformation by irradiating laser beams, and a method of manufacturing the optical information recording medium.

In order to attain the above object, there is provided an optical information recording medium comprising at least an optical information recording layer, a ultraviolet-curing resin layer, an adhesive layer and a light-transmissible layer formed on a substrate, wherein laser beams are incident from the light-transmissible layer to record and/or reproduce information.

In the optical information recording medium, the thickness of the ultraviolet-curing resin layer is set at a value in the range from 2 µm (micrometer) to 40 µm.

In the optical information recording medium, the total thickness of the ultraviolet-curing resin layer, the adhesive layer and the light-transmissible layer is set at a value in the range from 20 µm to 150 µm.

In the optical information recording medium, the hardness of the ultraviolet-curing layer is set to be HB or more.

In the optical information recording medium, the light transmittance of the ultraviolet-curing resin layer at a wavelength of 380 nm (nanometer) to 430 nm is equal to 70% or more, and the extinction coefficient of the ultraviolet-curing resin layer is equal to 0.005 or less.

In the optical information recording medium, the coefficient of contraction of the ultraviolet-curing resin before and after irradiation of ultraviolet rays is equal to 12% or less.

In the optical information recording medium, information is recorded or reproduced by using a laser beam having a wavelength of 380 nm to 430 nm.

A method of manufacturing an optical information recording medium according to the present invention is characterized by comprising the steps of: forming an optical information recording layer on a substrate; forming an ultraviolet-curing resin layer; irradiating ultraviolet-rays onto the ultraviolet-curing resin layer to cure the ultraviolet-curing resin; and adhesively attaching a light-transmissible layer to the ultraviolet-curing resin layer through an adhesive layer.

In order to suppress thermal deformation of the optical information recording medium, it is effective to thickly form a material having high hardness on the optical information recording layer. The thickness of the material is preferably set to 2 µm or more. In order to efficiently record or reproduce information, the material for suppressing the thermal deformation is required to have as high transmittance as possible at the wavelength of the laser beam. A dielectric layer of SiN or $SiO_2$ may be used as the material. However, it is difficult to form a dielectric layer having a thickness of 2 µm or more by a sputtering method or the like. Some of ultraviolet-curing resin materials have high hardness and high transmittance at the wavelength range of semiconductor lasers which are presently sold in the market. Further, these materials can be uniformly formed at a thickness of 2 µm or more by a spin coating method or the like. Therefore, these materials are suitably used as the material for suppressing the thermal deformation.

From the viewpoint of suppressing the thermal deformation, the hardness of the ultraviolet-curing resin layer is preferably equal to HB or more.

In order to reduce light absorption of the ultraviolet-curing resin layer and efficiently record or reproduce information, the transmittance of the ultraviolet-curing resin layer is preferably set to 70% or more. For this purpose, the extinction coefficient of the ultraviolet-curing resin layer is preferably equal to 0.005 or less. Here, the extinction coefficient is defined by α when extinction of light is in proportion to a function e(−αx) of a distance x in the layer thickness direction.

From the viewpoint of suppressing deformation, it is preferable that the thickness of the ultraviolet-curing resin layer is as large as possible. However, if the thickness is excessively large, the transmittance is reduced, so that it is preferable to set the thickness to 40 μm or less.

Further, when the ultraviolet-curing resin layer is formed by the spin coating, the radius-dependence of the film thickness would occur if the thickness is large, so that it is preferable that the thickness is set to 40 μm or less from the viewpoint of uniformity.

In addition, from the viewpoint of increasing record capacity, it is effective to use a laser beam having a short wavelength However, from the viewpoint of miniaturization of a device, a semiconductor layer is preferably used. For example, a semiconductor layer having a wavelength of around 400 nm (about 380 nm to 430 nm in wavelength) which can be used at present can be used.

DETAILED DESCRIPTION OF THE PREFERRED EMBODIMENT

The present invention will be described hereunder with reference to the accompanying drawings.

Figure 1:
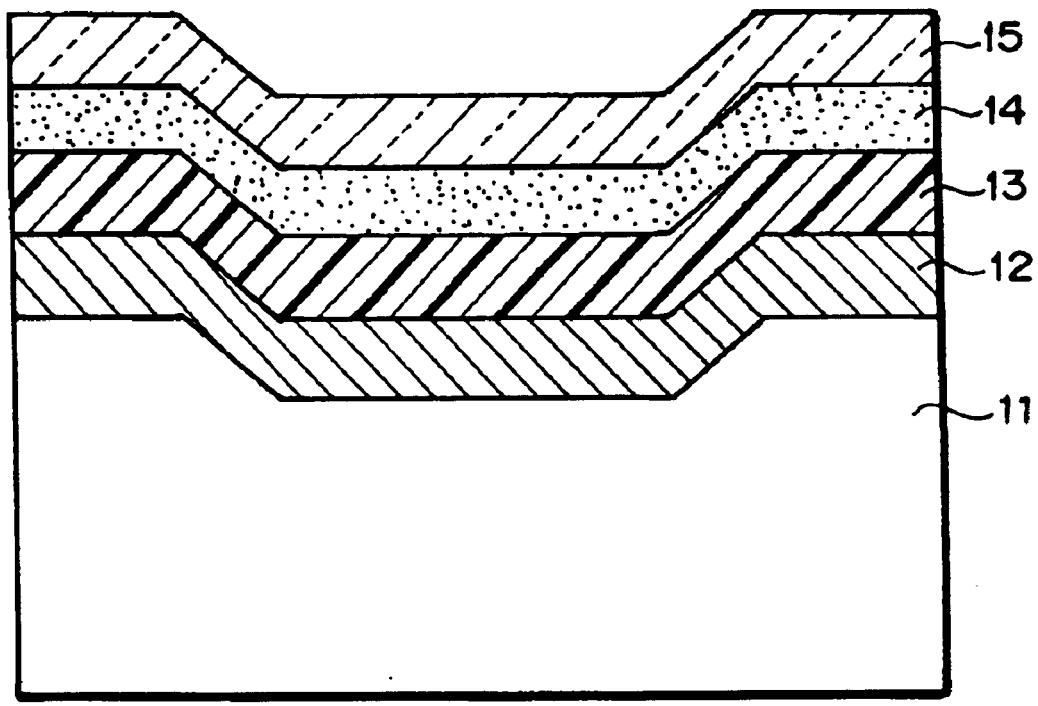
FIG. 1 is a cross-sectional view showing an embodiment of the construction of an optical information recording medium according to the present invention.

FIG. 1 shows the construction an optical information recording medium according to the present invention.

When a phase-change recording layer is used as an optical information recording layer, a reflection layer (not shown), a protection layer (not shown), optical information recording layer 12, protection layer (not shown), ultraviolet-curing resin layer 13, adhesive layer 14 and light-transmissible layer 15 are formed on substrate 11 on which a guide groove for tracking of a laser beam is formed.

Al, Au, Cu, Ag, Ti, Cr or alloy of these materials is generally used for the reflection layer, and $SiO_2$, SiN, $Ta_2O_5$, ZnS—$SiO_2$ or the like is used for the protection layer. The protection layer may be formed not only as a single layer, but also as a multi-layer. GeSbTe, SbTe, GeTe, AgInSbTe or the like may be used for the optical information recording layer 12, and an additive such as Ge, Sb, Te, Ag, Si, C, Bi, Sn or the like may be added to these materials. For the ultraviolet-curing resin layer 13 is suitably used material that has high transmittance at a wavelength around 400 nm (about 380 nm to 430 nm in wavelength) and has hardness of HB or more. If the coefficient of contraction of the ultraviolet-curing resin layer 13 is large, there would occur such a disadvantage that the tilt of the disk is increased after it is cured. Therefore, the coefficient of contraction is preferably equal to 12% or less. A double-side adhesive tape or a pressure-sensitive adhesive sheet may be used for the adhesive layer 14. Light-transmissible film such as polycarbonate, polyolefin or the like, thin-plate glass or the like may be used for the light-transmissible layer 15.

Not only a phase-change recording layer, but also a dye-based recording layer may be used for the optical information recording layer. In this case, the recording layer, the protection layer, the reflection layer, the ultraviolet-curing resin layer, the adhesive layer and the light-transmissible layer are formed on the substrate in this order.

A laser beam is irradiated from the light-transmissible layer side at the initialization or information recording time. Since the temperature of the recording layer is locally increased up to 300° C. due to irradiation of laser beams. Therefore, if any layer having high hardness does not exist between the recording layer and the light-transmissible layer, the recording layer is locally thermally deformed, and noises are greatly increased.

In the construction of the present invention, the ultraviolet-curing resin layer, preferably the ultraviolet-curing resin layer having hardness of HB or more is formed at a thickness of 2 μm or more between the recording layer and the light-transmissible layer. Therefore, the thermal deformation due to the laser beam irradiation can be suppressed, and excellent initialization and recording can be performed without increasing noises. Since the ultraviolet-curing resin layer has transmittance of 70% or more at a wavelength around 400 nm, the information recording/reproduction can be efficiently performed. Further, since the total film thickness of the ultraviolet-curing resin layer, the adhesive layer and the light-transmissible layer is set to 150 μm or less, so that a sufficient tilt margin can be secured. Considering weather resistance and the impact between an optical head and a disk, the lower limit of the total film thickness of the ultraviolet-curing resin layer, the adhesive layer and the light-transmissible layer is equal to about 20 μm. For example, SD-523 produced by Dainippon Ink Chemical Industry, Inc. may be used as ultraviolet-curing resin constituting the ultraviolet-curing resin layer.

Preferred embodiments according to the present invention will be described below.

(First Embodiment)

A substrate of polycarbonate having a thickness of 1.2 mm was used, and an Al—Cr reflection layer of 100 nm, a ZnS—$SiO_2$ protection layer of 20 nm, a $Ge_2Sb_2Te_5$ recording layer of 13 nm and a ZnS—SiO2 protection layer of 50 nm are successively laminated by sputtering. Thereafter, an ultraviolet-curing resin layer of 5 μm in thickness was formed by spin coating, and ultraviolet rays were irradiated to the ultraviolet-curing rein layer to cure the ultraviolet-curing resin layer. Thereafter, a polycarbonate film of 100 μm in thickness was attached to the cured ultraviolet-curing resin layer through an adhesive layer (pressure-sensitive adhesive sheet) of 30 μm in thickness. A guide groove was formed on the substrate so as to have a pitch of 0.6 μm and a depth of 40 nm. The transmittance of the ultraviolet-curing resin layer at the wavelength of 400 nm was equal to about 85%, and the hardness thereof was equal to H.

A semiconductor laser beam was irradiated to the disk while the disk was rotated at a linear velocity of 7.5 m/s to perform initialization. RIN (Relative Intensity of Noise, RIN=$(\Delta P^2/P^2) \times (1/\Delta f)$; P represents the DC component of optical output, ΔP represents the AC component of optical output, Δf represents the measurement band width) of the disk before and after the initialization was measured. A semiconductor laser of 810 nm in wavelength and 100 μm×1 μm in beam diameter was used for initialization. The RIN measurement was carried out by using an optical head of 400 nm in wavelength, NA=0.8.

As shown in the following table 1, it was found that RIN was little increased in the optical information recording medium of the embodiment even when initialization was carried out. For comparison, a disk was formed so that it had the same construction as the substrate and the recording layer of the above substrate, but a light-transmissible film serving as a light-transmissible layer was attached through an adhesive layer (pressure-sensitive adhesive sheet) without forming any ultraviolet-curing resin layer, and RIN of the disk thus formed was measured before and after initialization. As shown in the following table 2, RIN was greatly increased due to the initialization.

TABLE 1

Relationship between Initializing power and RIN

| NON-INITIALIZED PORTION | INITIALIZING POWER 500 mW | INITIALIZING POWER 600 mW | INITIALIZING POWER 700 mW |
|---|---|---|---|
| −117 dB/Hz | −116 dB/Hz | −116.2 dB/Hz | −116.3 dB/Hz |

TABLE 2

Relationship between Initializing Power and RIN

| NON-INITIALIZED PORTION | INITIALIZING POWER 500 mW | INITIALIZING POWER 600 mW | INITIALIZING POWER 700 mW |
|---|---|---|---|
| −117 dB/Hz | −112 dB/Hz | −110.2 dB/Hz | −107.5 dB/Hz |

(Second Embodiment)

A substrate of polycarbonate having a thickness of 1.2 mm was used, and an Al-Ti reflection layer of 100 nm, a ZnS—$SiO_2$ protection layer of 15 nm, a $Ge_2Sb_2Te_5$ recording layer of 12 nm and a ZnS—$SiO_2$ protection layer of 60 nm are successively laminated by sputtering. Thereafter, an ultraviolet-curing resin layer was formed by spin coating, and ultraviolet rays were irradiated to the ultraviolet-curing rein layer to cure the ultraviolet-curing resin layer. Thereafter, a polycarbonate film of 100 $\mu$m in thickness was attached to the cured ultraviolet-curing resin layer through an adhesive layer (pressure-sensitive adhesive sheet) of 30 $\mu$m in thickness. A guide groove was formed on the substrate so as to have a pitch of 0.6 $\mu$m and a depth of 40 nm. The hardness of the ultraviolet-curing resin layer was equal to 2H.

Figure 2:
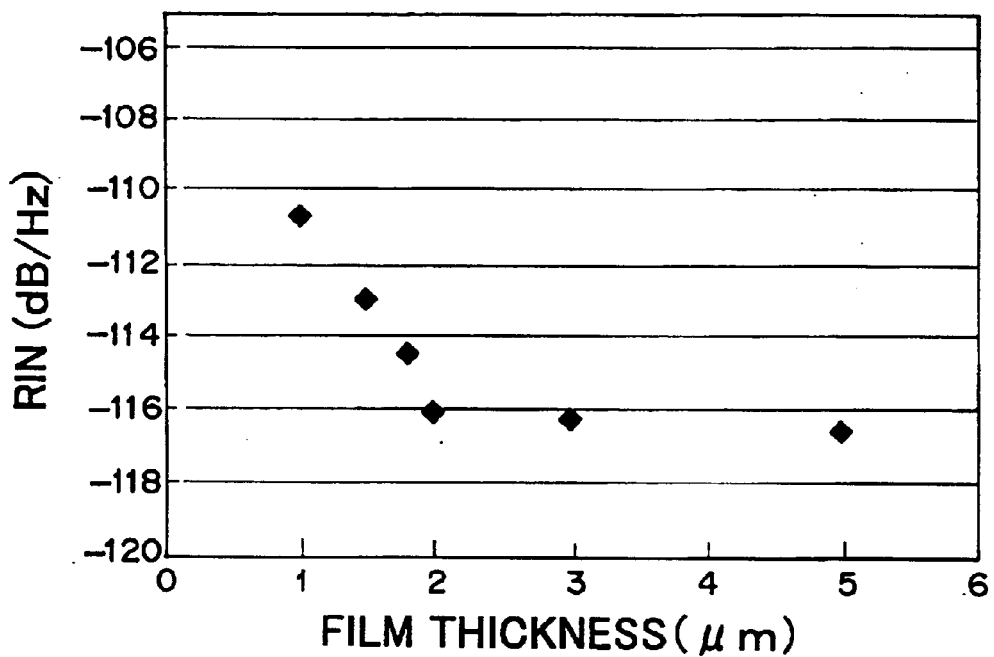
FIG. 2 is a diagram showing the relationship between the film thickness of an ultraviolet-curing resin layer and RIN at the initializing time.

Disks were formed while the film thickness of the ultraviolet-curing resin was varied by changing the condition (rotational number) of the spin coating, and the relationship between the film thickness of the ultraviolet-curing resin layer and the disk RIN after initialization was examined Like the first embodiment, the initialization was carried out by irradiating a semiconductor laser beam of 810 nm in wavelength while the disk was rotated at a linear velocity of 7.5 m/s. The initializing power was set to 500 mW (milliwatt) As shown in FIG. 2, it was found that RIN would increase if the film thickness is thinner than 2 $\mu$m.

(Third Embodiment)

Figure 3:
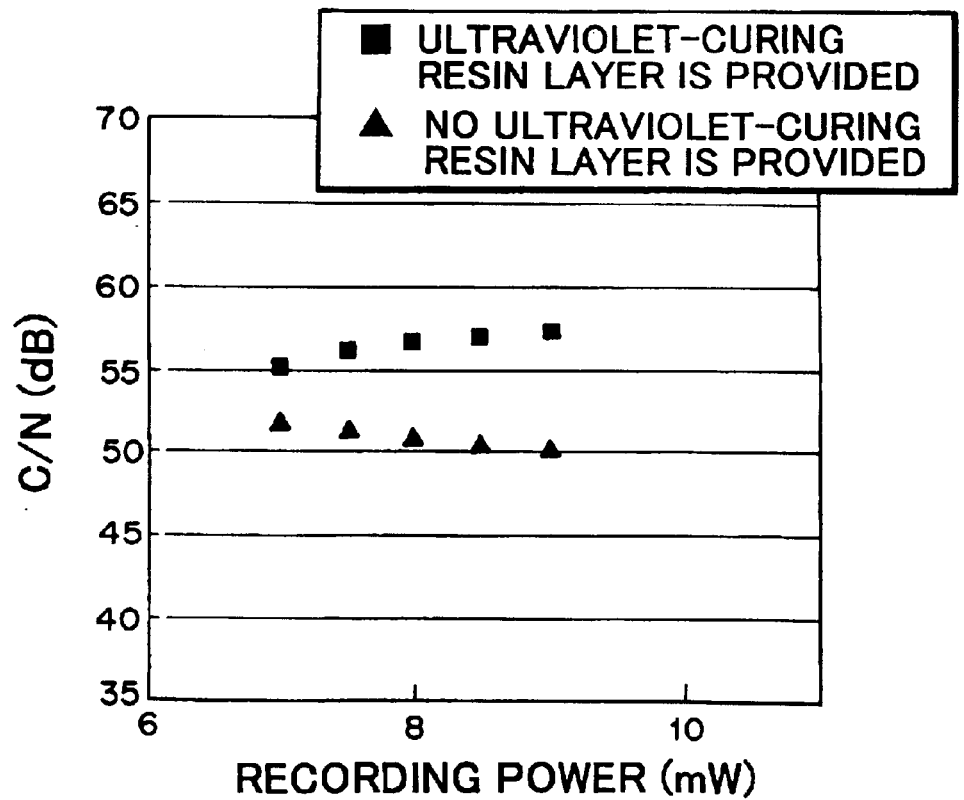
FIG. 3 is a diagram showing the relationship between recording power and C/N.

A substrate of polycarbonate having a thickness of 1.2 mm was used, and a dye-based recording layer and an Al—Ti reflection layer were laminated in this order. Thereafter, an ultraviolet-curing resin layer of 5 $\mu$m in thickness was formed by spin coating, and ultraviolet rays were irradiated to the ultraviolet-curing rein layer to cure the ultraviolet-curing resin layer. Thereafter, a polycarbonate film of 100 $\mu$m in thickness was attached to the cured ultraviolet-curing resin layer through an adhesive layer (pressure-sensitive adhesive sheet) of 30 $\mu$m in thickness. A guide groove was formed on the substrate so as to have a pitch of 0.8 $\mu$m and a depth of 40 nm. A signal having a recording frequency of 2 MHz, duty=50% was recorded by using an optical head having 650 nm in wavelength and an objective lens of NA=0.8 while the disk was rotated at a linear velocity of 5 m/s, and C/N (Carrier to Noise Ratio) was measured. For comparison, a light-transmissible film serving as a light-transmissible layer was attached through an adhesive layer without forming any ultraviolet-curing resin layer to form a disk, and C/N was measured in the same manner. FIG. 3 shows a measurement result. It is apparent from FIG. 3 that the formation of the ultraviolet-curing resin layer provides higher C/N. As not shown in FIG. 3, the difference in CIN between both the disks is caused by the difference between noises. At present, a dye-based recording layer which is recordable by a laser beam having a wavelength around 400 nm (about 380 nm to 430 nm in wavelength) has not yet generally known. However, even when the development of the recording layer materials is promoted and the recording can be carried out at a wavelength around 400 nm, increase of noises in the recording operation can be suppressed by applying the present invention, so that the recording density can be increased.

(Fourth Embodiment)

A substrate of polycarbonate having a thickness of 1.2 mm was used, and an Al-Ti reflection layer of 100 nm, a ZnS—$SiO_2$ protection layer of 15 nm, a $Ge_2Sb_2Te_5$ recording layer of 12 nm and a ZnS—$SiO_2$ protection layer of 60 nm are successively laminated by sputtering. Thereafter, an ultraviolet-curing resin layer was formed by spin coating, and ultraviolet rays were irradiated to the ultraviolet-curing rein layer to cure the ultraviolet-curing resin layer. Thereafter, a polycarbonate film of 100 $\mu$m in thickness was attached to the cured ultraviolet-curing resin layer through an adhesive layer (pressure-sensitive adhesive sheet) of 30 $\mu$m in thickness. At this time, the film thickness of the ultraviolet-curing resin was varied by changing the spin coating condition to form disks whose transmittance was varied from 60% to 85% at a wavelength of 400 nm. A guide groove was formed on the substrate so as to have a pitch of 0.6 $\mu$m and a depth of 40 nm. The hardness of the ultraviolet-curing resin layer was equal to 2H. Like the above embodiment, initialization was carried out by irradiating a semiconductor laser beam of 810 nm in wavelength while a disk was rotated at a linear velocity of 7.5 m/s.

The disk after the initialization was rotated at a linear velocity of 10 m/s, a mark of 0.17 $\mu$m in length was recorded by using an optical head of 400 nm in wavelength and NA=0.85, and C/N was measured. If the transmittance was not more than 70%, the reproduction light amount was reduced, and only C/N having 45 dB or less was obtained.

(Fifth Embodiment)

A substrate of polycarbonate having a thickness of 1.2 mm was used, and an Al-Ti reflection layer of 100 nm, a ZnS—$SiO_2$ protection layer of 15 nm, a $Ge_2Sb_2Te_5$ recording layer of 12 nm and a ZnS—$SiO_2$ protection layer of 60 nm are successively laminated by sputtering. Thereafter, an ultraviolet-curing resin layer having a coefficient of contraction varying after it was cured was formed by spin coating, and ultraviolet rays were irradiated to the ultraviolet-curing rein layer to cure the ultraviolet-curing resin layer. The disk tilt (inclination) after cured was measured, and when the coefficient of contraction was more than 12%, the measurement result indicated that the tilt was increased to 0.5 degree or more.

As described above, according to the present invention, in the optical information recording medium having the optical information recording layer on the substrate and the light-transmissible layer formed on the optical information recording layer to record and reproduce information having high density by irradiating a laser beam from the light-transmissible layer side, excellent initialization or excellent recording can be performed without inducing thermal deformation by irradiating a laser beam.

What is claimed is:

1. An optical information recording medium comprising: an optical information recording layer, an ultraviolet-curing resin layer, an adhesive layer and a light-transmissible layer formed on a substrate, wherein laser beams are incident from said light-transmissible layer to record and/or reproduce information, and wherein the total thickness of said ultraviolet-curing resin layer, said adhesive layer and said light-transmissible layer is set at a value in the range from 20 $\mu$m to 150 $\mu$m.

2. An optical information recording medium comprising: an optical information recording layer, an ultraviolet-curing resin layer, an adhesive layer and a light-transmissible layer formed on a substrate, wherein laser beams are incident from said light-transmissible layer to record and/or reproduce information, and wherein the light transmittance of said ultraviolet-curing resin layer at a wavelength of 380 nm to 430 nm is equal to 70% or more.

3. An optical information recording medium comprising: an optical information recording layer, an ultraviolet-curing resin layer, an adhesive layer and a light-transmissible layer formed on a substrate, wherein laser beams are incident from said light-transmissible layer to record and/or reproduce information, and wherein the extinction coefficient of said ultraviolet-curing resin layer at a wavelength of 380 nm to 430 nm is equal to 0.005 or less.

4. An optical information, recording medium comprising: an optical information recording layer, an ultraviolet-curing resin layer, an adhesive layer and a light-transmissible layer formed on a substrate, wherein laser beams are incident from said light-transmissible layer to record and/or reproduce information, and wherein the coefficient of contraction of said ultraviolet-curing resin before and after irradiation of ultraviolet rays is equal to 12% or less.

* * * * *